(12) United States Patent
Ando et al.

(10) Patent No.: US 8,029,372 B2
(45) Date of Patent: Oct. 4, 2011

(54) CONSTANT VELOCITY UNIVERSAL JOINT

(75) Inventors: Atsushi Ando, Kariya (JP); Tomohiko Sato, Toyota (JP); Takumi Matsumoto, Nishikamo-gun (JP); Takeo Yamamoto, Nissin (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 337 days.

(21) Appl. No.: 12/277,993

(22) Filed: Nov. 25, 2008

(65) Prior Publication Data
US 2009/0137325 A1    May 28, 2009

Related U.S. Application Data

(63) Continuation-in-part of application No. 10/549,565, filed as application No. PCT/IB2004/004048 on Dec. 9, 2004, now abandoned.

(30) Foreign Application Priority Data

Dec. 22, 2003 (JP) ................................. 2003-425109

(51) Int. Cl.
*F16D 3/205* (2006.01)
(52) U.S. Cl. ........................................ 464/111; 464/905
(58) Field of Classification Search .................. 464/111, 464/905
See application file for complete search history.

(56) References Cited

U.S. PATENT DOCUMENTS

| | | | |
|---|---|---|---|
| 5,171,185 A | 12/1992 | Schneider | |
| 5,256,107 A | 10/1993 | Matsumoto et al. | |
| 5,330,389 A * | 7/1994 | Jost et al. | 464/111 |
| 5,935,009 A | 8/1999 | Hosdez et al. | |
| 6,217,454 B1 * | 4/2001 | Ikeda et al. | 464/111 |
| 6,322,453 B1 | 11/2001 | Ishiguro et al. | |
| 7,544,131 B2 * | 6/2009 | Ando et al. | 464/111 |
| 2002/0128078 A1 | 9/2002 | Kawakatsu et al. | |
| 2003/0060291 A1 | 3/2003 | Bartlett | |
| 2006/0105845 A1 * | 5/2006 | Girguis | 464/111 |

FOREIGN PATENT DOCUMENTS

| | | |
|---|---|---|
| JP | 5-215141 | 8/1993 |
| JP | 11-125262 A2 | 5/1999 |
| JP | 2000-046062 A | 2/2000 |
| JP | 2001-234940 A | 8/2001 |
| JP | 2002-147482 A | 5/2002 |

\* cited by examiner

*Primary Examiner* — Gregory Binda
(74) *Attorney, Agent, or Firm* — Kenyon & Kenyon LLP

(57) ABSTRACT

A constant velocity universal joint is provided, having a hollow outer joint member, an inner joint member, an outer roller including a cylindrical surface, an inner roller including a concave sphere, and plural leg shafts each including a convex sphere formed in a tip portion and engaging with the concave sphere, where the cylindrical surface of the outer roller satisfies the following:

$$W1 > PCR(1-\cos\theta)/2 + \mu_3 R_3 + \mu_2 R1$$

$$W2 > 3PCR(1-\cos\theta)/2 - \mu_3 R_3 + \mu_2 R1,$$

where W1 indicates a length of the cylindrical surface from a center of the leg shaft and an intersection of the cylindrical surface and an upper side taper portion of the outer roller, W2 indicates a length of the cylindrical surface from the center of the leg shaft and an intersection of the cylindrical surface and a lower side taper portion of the outer roller, and $\theta$ indicates a maximum joint angle.

1 Claim, 13 Drawing Sheets

CONSTANT VELOCITY UNIVERSAL JOINT

CROSS REFERENCE TO RELATED APPLICATIONS

The present application is a Continuation-In-Part application of U.S. patent application Ser. No. 10/549,565 filed Sep. 19, 2005, now abandoned, which was a 371 national phase application of PCT/IB04/04048 filed Dec. 9, 2004, which claimed priority to Japanese Patent Application No. 2003-425109 filed Dec. 22, 2003, the contents of which are incorporated herein by reference.

TECHNICAL FIELD

The invention relates to a constant velocity universal joint in which a double roller type roller unit is fitted to a leg shaft. More specifically, the invention relates to a constant velocity universal joint in which a convex sphere is formed in a leg shaft and a concave sphere, which is engaged with the convex sphere, is formed in an inner roller of a roller unit.

BACKGROUND

Constant velocity universal joints (CV joints) are sometimes used in a drive shaft of a vehicle. CV joints connect two shafts on a drive side and a driven side such that a rotational force can be transmitted at a constant velocity even when there is an angle between the two shafts. A CV joint including a leg shaft and a roller (for example, a tripod constant velocity universal joint) is known. In the case of the tripod constant velocity universal joint, an inner joint member is connected to one shaft, an outer joint member is connected to the other shaft, and a roller fitted to the leg shaft is housed in the guide groove of the outer joint member, whereby the two shafts are connected to each other and torque is transmitted. The inner joint member includes three leg shafts that protrude in a radial direction. The outer joint member is a hollow cylinder that includes three guide grooves that extend in an axial direction of the outer joint member.

In a known tripod type CV joint (such as that shown in FIG. 10, for example), a roller 6 includes an inner roller 6b and an outer roller 6a that can be moved in the axial direction with respect to each other such that the roller 6 can be moved in parallel along a guide groove 2a. A convex sphere is formed in a tip portion of a leg shaft 5a, and a concave sphere is formed in an inner peripheral surface of inner roller 6b such that leg shaft 5a and the inner roller 6b can be oscillated with respect to each other (for example, refer to Japanese Patent Laid-Open Publication No. 2002-147482, the entirety of which is incorporated herein by reference). With this configuration, when a CV joint 1 is rotated at an angle (the joint angle), inner roller 6b fitted to leg shaft 5a is moved in the axial direction with respect to outer roller 6a. However, outer roller 6a is moved only in parallel along guide groove 2a. Therefore, less friction occurs as compared to when the entire roller 6 is displaced in the axial direction. Thus, it is possible to suppress a thrust force of outer joint member 2 in the axial direction that is generated due to the friction. In turn, it is possible to suppress vibration caused by this thrust force.

In a CV joint having the aforementioned structure, the outer roller may make angular contact with the guide groove of the outer joint member in order to make the posture of the outer roller stable. FIG. 11 shows a case where the outer roller 6a makes angular contact with the guide groove 2a of the outer joint member 2. The outer roller 6a makes contact with the guide groove 2a at contact points A and B. Points A and B are symmetrical with respect to a plane that passes through the center of outer roller 6a in the axial direction and that is perpendicular to the axis.

However, when the outer roller makes angular contact with the groove of the outer joint member, since a contact point between the leg shaft and the inner roller is moved due to rotation of the joint, a thrust force is generated in the axial direction of the outer joint member (the Z-axis direction). This thrust force causes vibration in the CV joint member, as described in detail below.

Referring to FIG. 11, when CV joint 1 is rotated by a joint angle, leg shaft 5a and inner roller 6b are moved in the axial direction of inner roller 6b (the Y-axis direction), and friction occurs between inner roller 6b and a needle bearing 7. Therefore, the contact point between leg shaft 5a and inner roller 6b is moved along the inner sphere of inner roller 6b as shown by arrow D so that force balancing with the frictional force is generated at the contact point.

When the contact point between leg shaft 5a and inner roller 6b is moved as shown by arrow D and as described above, moment Mz around the Z-axis is generated between outer roller 6a and needle bearing 7. In order to balance with moment Mz, a contact load is generated, for example, at a point K on a rear surface side which is opposed to a side where a load is applied. When roller unit 6 is moved in the Z-axis direction while the contact load is applied, a frictional force Rk is generated at point K. Further, moment My around the Y-axis is generated due to frictional force Rk. Therefore, in order to balance moment My generated due to the frictional force Rk, frictional forces Ra and Rb are generated also at contact points A and B (respectively) between outer roller 6a and outer joint member 2 on the side where the load is applied. FIG. 12 is a diagram showing the directions of frictional forces Ra and Rb. FIG. 12 a schematic arrow cross-sectional view taken along line XII-XII in FIG. 11. As shown in FIG. 12, the frictional forces Ra and Rb, which are generated at the contact points A and B in order to make the moment My zero, are applied in the same direction as the direction in which the frictional force Rk is applied. Therefore, the thrust force is a resultant force of the three frictional forces Rk, Ra, and Rb, as expressed in Equation 1. Also, frictional forces Ra and Rb are obtained according to Equation 2, which indicates the balance between frictional forces Ra and Rb and moment My. Thus, the large thrust force in the Z-axis direction is generated when the contact point between leg shaft 5a and inner roller 6b is moved.

$$\text{Thrust force} = -(Rk + Ra + Rb) \quad \text{(Equation 1)}$$

$$My = Rk \times d1 - (Ra + Rb) \times d2 = 0.$$

In Equation 2, d1 indicates a length in an X-axis direction from an axis of the inner roller to point K, and d2 indicates a length in the X-axis direction from the axis of the inner roller to point A (or point B).

SUMMARY

In view of the above, a constant velocity universal joint in which a thrust force generated during rotation can be suppressed is provided.

An aspect of the invention relates to a constant velocity universal joint including (a) a hollow outer joint member in which plural guide grooves extending in an axial direction of the outer joint member are formed in a inner peripheral surface in an axial direction, and which is connected to a first shaft; (b) an inner joint member which is connected to a second shaft, and which is housed in the outer joint member;

(c) plural leg shafts provided in the inner joint member, each of which protrudes in a radial direction of the second shaft, and in each of which a convex sphere is formed in a tip portion; (d) an inner roller in which a concave sphere that is engaged with the convex sphere of each of the leg shafts is formed in an inner peripheral surface; (e) an outer roller which is housed in each of the guide grooves of the outer joint member so as to be slidable; (f) a rolling body which is provided between the inner roller and the outer roller so that the inner roller and the outer roller are movable with respect to each other in an axial direction of the inner roller and the outer roller, wherein each of the leg shafts and the inner roller can be oscillated with respect to each other, wherein (g) the leg shafts and the inner roller can be oscillated with respect to each other. The constant velocity universal joint is characterized in that (h) a cylindrical surface is formed in a radially outer surface of the outer roller; (i) a flat engagement surface which is engaged with the cylindrical surface of the outer roller is formed in a lateral surface of each of the guide grooves of the outer joint member; and (j) the cylindrical surface of the outer roller satisfies the following two equations.

$$W1 > PCR(1-\cos\theta)/2 + \mu_3 R_3 + \mu_2 R1 \quad \text{(Equation 3)}$$

$$W2 > 3PCR(1-\cos\theta)/2 - \mu_3 R_3 + \mu_2 R1 \quad \text{(Equation 4)}$$

In these equations, W1 indicates a length in an axial direction of the cylindrical surface from a center of the leg shaft and an intersection of the cylindrical surface of the outer roller and an upper side taper portion of the outer roller, W2 indicates a length in the axial direction of the cylindrical surface from the center of the leg shaft and an intersection of the cylindrical surface of the outer roller and a lower side taper portion of the outer roller, PCR indicates a distance from an axis of the inner joint member to a center of the convex sphere of each of the leg shafts, θ indicates a required maximum joint angle, R1 indicates a radius of the cylindrical surface of the outer roller, R3 indicates a radius of the concave sphere of the inner roller, $\mu_2$ indicates a friction coefficient when the inner roller is moved with respect to the outer roller in an axial direction of the inner roller, and $\mu_3$ indicates a friction coefficient between the convex sphere of each of the leg shafts and the concave sphere of the inner roller.

In the constant velocity universal joint having the aforementioned structure, the right side of Equation 3 indicates a distance in the axial direction of the outer roller from the center of the leg shaft in the axial direction to an upper position where a load is concentrated (upper load concentration position), in the case where the leg shaft has been moved to an outer side of the outer joint member in the radial direction to the fullest extent. The right side of Equation 4 indicates a distance in the axial direction of the outer roller from the center of the leg shaft in the axial direction to a lower load concentration position, in the case where the leg shaft has been moved to a joint center side of the outer joint member in the radial direction to the fullest extent. Therefore, when the length of the cylindrical surface of the outer roller in the axial direction is set so as to satisfy Equations 3 and 4, the load concentration position of the outer roller is prevented from moving out of the cylindrical surface of the outer roller as long as the joint angle is equal to or smaller than the maximum joint angle θ. Therefore, the moment for tilting the outer roller, which is generated when the contact point between the leg shaft and the inner roller is moved, is absorbed between a flat surface portion of the guide groove of the outer joint member and the cylindrical surface of the outer roller. As a result, a contact load which is generated on the rear surface side is reduced, and accordingly, the frictional force is reduced. Thus, the thrust force can be suppressed during rotation.

Also, in the aforementioned constant velocity universal joint, a taper surface whose diameter decreases toward an end portion may be formed in each of axially both sides of the cylindrical surface of the outer roller, and a taper surface may be formed in the lateral surface of each of the guide grooves at a portion opposed to each taper portion of the outer roller, a taper surface formed in the lateral surface of each of the guide grooves becoming closer to a plane including an axis of the outer roller and an axis of the outer joint member toward each of axially both sides of the outer roller.

A chamfer that is a curved surface may be formed on each of axially both sides of the cylindrical surface of the outer roller.

Further, a concave curved surface may be formed in the lateral surface of each of the guide grooves at a portion opposed to each chamfer of the outer roller.

In the aforementioned constant velocity universal joint, a taper surface whose diameter decreases toward an end portion may be formed in each of axially both sides of the cylindrical surface of the outer roller, and a convex curved surface which protrudes toward an inner side of the outer joint member may be formed in the lateral surface of each of the guide grooves at a portion opposed to each taper surface of the outer roller.

With the constant velocity universal joint having the aforementioned structure, it is possible to more reliably prevent an end surface of the outer roller on the axially outer side from making contact with the inner surface of the outer joint member. Further, it is easy to manufacture the constant velocity universal joint in which the chamfer that is the curved surface is formed on each of axially both sides of the cylindrical surface of the outer roller, and the concave curved surface is formed in the lateral surface of each of the guide grooves at the portion opposed to each chamfer of the outer roller.

BRIEF DESCRIPTION OF THE DRAWINGS

The present invention will become more fully understood from the detailed description given hereinbelow and the accompanying drawings, which are given by way of illustration only, and thus are not limitative of the present invention, and wherein.

DETAILED DESCRIPTION

Figure 1:
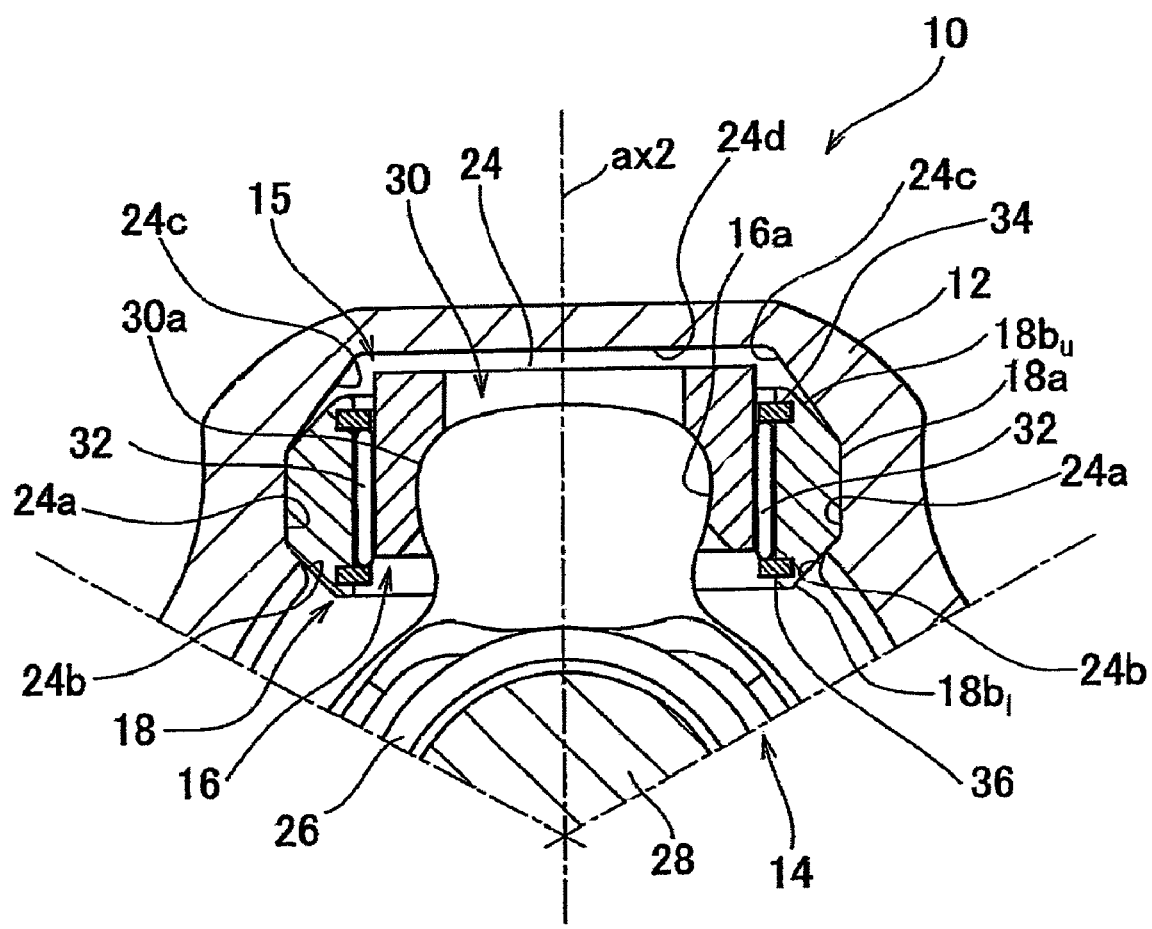
FIG. 1 is a cross sectional view of a constant velocity universal joint according to an embodiment of the invention, which is taken along a plane perpendicular to an axis of an outer joint member.
Figure 2:
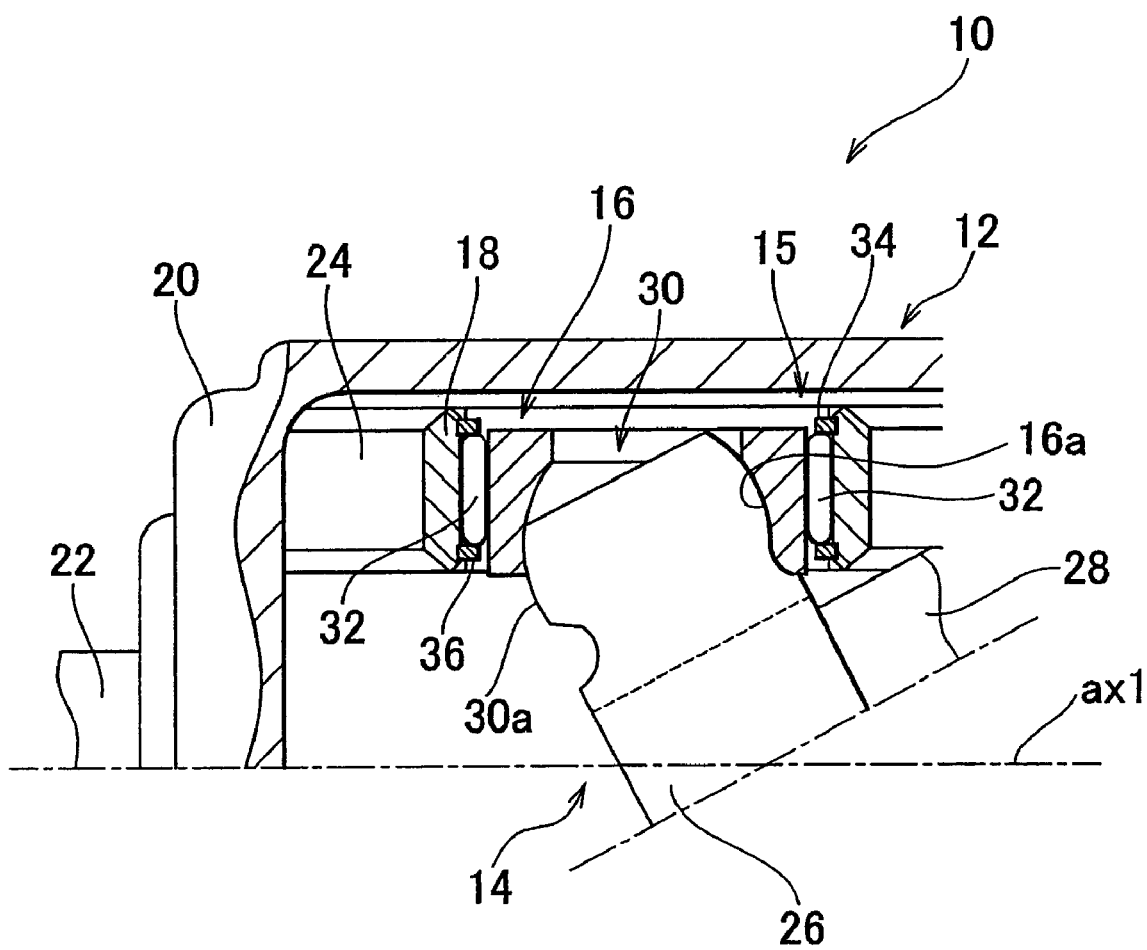
FIG. 2 is a cross sectional view of the constant velocity universal joint in FIG. 1, taken along a plane including the axis of the outer joint member.

In the following description and accompanying drawings, the present invention will be described in more detail in terms of exemplary embodiments. Throughout this description, by "in the axial direction" is meant a direction along axis ax2 in FIG. 1. FIG. 1 is a cross sectional view of a constant velocity universal joint (CV joint) 10 according to an embodiment of the present invention, taken along a plane perpendicular to an axis ax1 of an outer joint member 12. FIG. 2 is a cross sectional view of CV joint 10, taken along a plane including axis ax1 of outer joint member 12.

CV joint 10 is a double roller type and includes outer joint member 12, an inner joint member 14, and a roller unit 15. Outer joint member 12 is a hollow member and has a bottom portion 20 at one end in an axial direction. The other end (not shown) of outer joint member 12 in the axial direction is open. A first shaft 22 is connected to bottom portion 20 of outer joint member 12 such that the axis of the first shaft 22 overlaps with axis ax1 of outer joint member 12, whereby outer joint member 12 and first shaft 22 are integrated. Three guide grooves 24 extending in the direction of axis ax1 are formed at equal intervals in a circumferential direction in an inner peripheral surface of outer joint member 12 (FIGS. 1 and 2 show only one guide groove 24).

Inner joint member 14 is introduced from an opening (not shown) of outer joint member 12 to the inside of outer joint member 12. Thus, inner joint member 14 is housed within outer joint member 12. Inner joint member 14 includes a cylindrical boss portion 26. A second shaft 28 is fitted into boss portion 26 such that second shaft 28 cannot be rotated with respect to boss portion 26. Three leg shafts 30 protrude from boss portion 26 in a radial direction (FIGS. 1 and 2 show only one leg shaft, a third of CV joint 10). The leg shafts protrude at equal intervals in the circumferential direction of the inner joint member 14 (e.g., every 120° in the case of three equally-spaced leg shafts). A convex sphere 30a is formed at a tip portion of each leg shaft.

Roller unit 15 includes an inner roller 16 and an outer roller 18. Inner roller 16 is a cylindrical member. A concave sphere 16a is formed in an inner peripheral surface of inner roller 16. Concave sphere 16a engages with a convex sphere 30a of each leg shaft 30. Inner roller 16 cannot move along an axis ax2 of roller unit 15. However, inner roller 16 rotates about axis ax2. Also, inner roller 16 is fitted to leg shaft 30 such that inner roller 16 and leg shaft 30 can oscillate with respect to one another.

Outer roller 18 is a cylindrical member. Inner roller 16 is fitted in an inner peripheral side of outer roller 18. The axis of outer roller 18 aligns with axis ax2 of roller unit 15. Also, outer roller 18 is housed in guide groove 24 such that outer roller 18 cannot be moved along axis ax2. However, outer roller 18 can be slid along guide groove 24 in the direction of axis ax1. The outer surface of outer roller 18 includes a cylindrical surface 18a, an upper side taper portion $18b_u$, and a lower side taper portion $18b_l$, which are formed axially on both sides of cylindrical surface 18a. Each taper portion $18b_u$ and $18b_l$ is formed such that the radius linearly decreases toward an end portion.

Guide groove 24, which houses outer roller 18, includes paired flat lateral surfaces 24a, paired inner taper lateral surfaces 24b, paired outer taper lateral surfaces 24c, and a connection surface 24d. Lateral surfaces 24a are parallel to a plane including axis ax1 of outer joint member 12 and axis ax2 of roller unit 15, as shown in FIG. 1. Each of the inner taper lateral surfaces 24b is connected to an inner line (toward the center of outer joint member 12) of each flat lateral surface 24a. Each of the outer taper lateral surfaces 24c is connected to an outer line of each of the flat lateral surfaces 24a. Connection surface 24d connects paired outer taper surfaces 24c to one another.

The width (along axis ax2) of each of the flat lateral surfaces 24a is the same as the width of each cylindrical surface 18a of outer roller 18. Each of the flat lateral surfaces 24a is engaged with the entire width of cylindrical surface 18a of outer roller 18. Therefore, flat lateral surfaces 24a serve as engagement surfaces. Each of the inner taper lateral surfaces 24b and the outer taper lateral surfaces 24c are formed so as to become closer to a plane including axis ax2 of roller unit 15 and axis ax1 of outer joint member 12 toward both sides in the direction of axis ax2. The inclination of each of the inner taper lateral surfaces 24b and the outer taper lateral surfaces 24c is milder than that of each taper portion $18b_u$ and $18b_l$ of outer roller 18, such that each inner taper lateral surface 24b and each outer taper lateral surface 24c do not have contact with any taper portion $18b_u$ and $18b_l$ or any end surface of outer roller 18 in the axial direction.

Plural needle rollers 32, which serve as rolling bodies, are provided in the circumferential direction between outer roller 18 and inner roller 16 of roller unit 15. Snap rings 34 and 36 for preventing needle rollers 32 from dropping off between outer roller 18 and inner roller 16 are fixed axially at both end portions of the inner peripheral surface of outer roller 18.

Further, the length of cylindrical surface 18a of outer roller 18 satisfies Equations 3 and 4 below.

$$W1 > PCR(1-\cos\theta)/2 + \mu_3 R3 + \mu_2 R1 \quad \text{(Equation 3)}$$

$$W2 > 3PCR(1-\cos\theta)/2 - \mu_3 R3 + \mu_2 R1 \quad \text{(Equation 4)}$$

In the above equations, W1 indicates a length in an axial direction of the cylindrical surface from a center of leg shaft 30 and an intersection of cylindrical surface 18a and upper side taper portion $18b_u$ of outer roller 18. W2 indicates a length in the axial direction of the cylindrical surface from the center of leg shaft 30 and an intersection of cylindrical surface 18a and lower side taper portion $18b_l$ of outer roller 18. PCR indicates a distance from an axis of inner joint member 14 to a center of convex sphere 30a of each leg shafts 30. Theta (θ) indicates a required maximum joint angle. R1 indicates a radius of cylindrical surface 18a of outer roller 18. R3 indicates a radius of concave sphere 16a of inner roller 16. While $\mu_2$ indicates a friction coefficient between inner roller 16 and needle roller 32, $\mu_3$ indicates a friction coefficient between convex sphere 30a of each leg shaft 30 and concave sphere 16a of inner roller 16.

Figure 3:
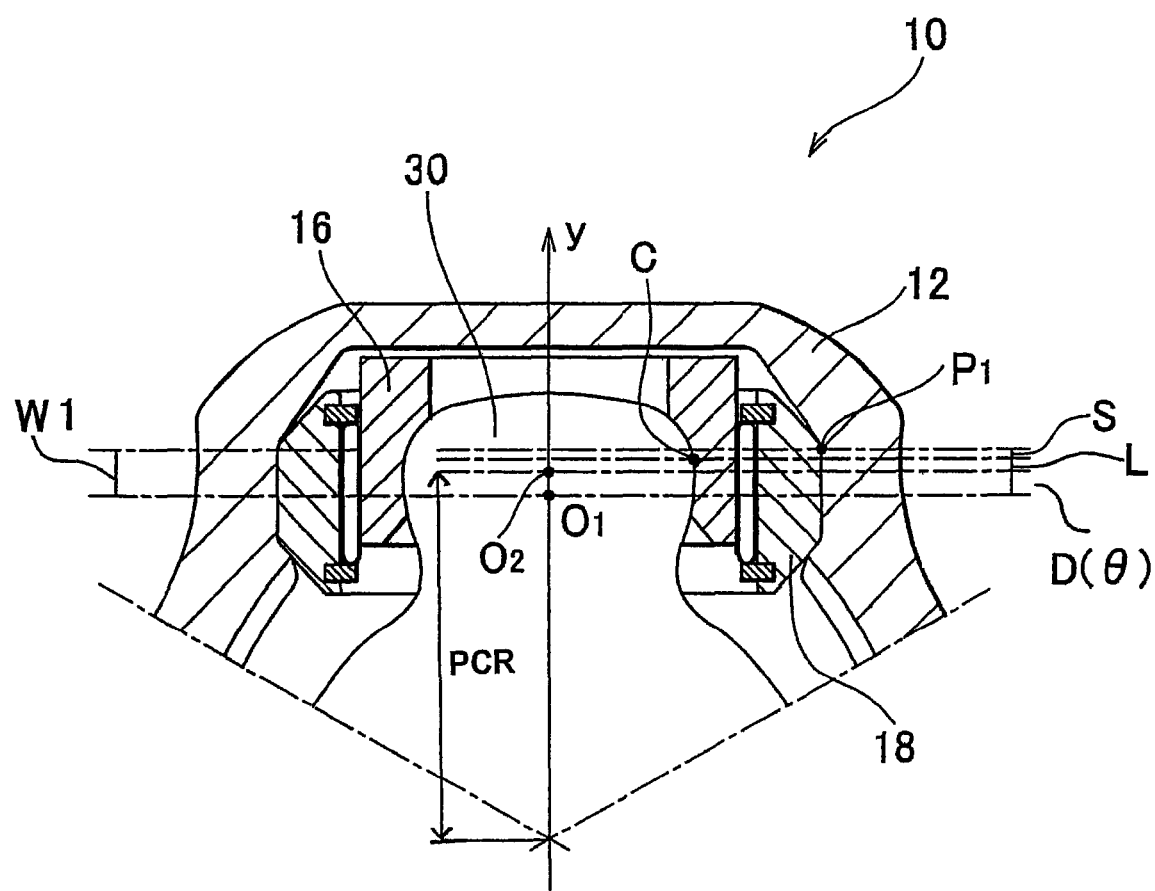
FIG. 3 is a cross sectional view of the constant velocity universal joint taken along the same plane as in FIG. 1.

Equation 3 will now be described in detail with reference to FIGS. 3 and 4. In CV joint 10, convex sphere 30a is formed at the tip of each of the leg shafts 30, and concave sphere 16a, which is engaged with each convex sphere 30a, is formed in the inner peripheral surface of inner roller 16. Therefore, when CV joint 10 is rotated by a given joint angle, each of the leg shafts 30 and inner roller 16 move with respect to outer roller 18 in both directions of axis ax2, and a contact point C between leg shaft 30 and inner roller 16 is moved. Therefore, moment Mz about axis ax1 (the Z-axis) of outer joint member 12, which tilts outer roller 18 in a direction perpendicular to the Z-axis, is generated.

If the length of cylindrical surface 18a of outer roller 18 in the axial direction and the width of flat lateral surface 24a of guide groove are sufficiently long, a load is applied to cylindrical surface 18a and flat lateral surface 24a due to moment Mz. (It may be assumed that the load is applied at one point.) The position of this point in the direction of axis ax2 (the Y-axis) is referred to as the "load concentration position P". Load concentration position P is moved when contact point C is moved.

The maximum joint angle θ is the maximum value in a joint angle range in which occurrence of the thrust force and vibration caused due to the thrust force are required to be reduced. When CV joint 10 is rotated to the maximum joint angle θ, a length L' (not shown) from a center $O_1$ of outer roller 16 (that is, a center $O_2$ of convex sphere 30a at a joint angle of 0°) to an uppermost load concentration position $P_1$ in the Y-axis direction is the sum of a leg shaft movement amount D(θ), a leg shaft contact point movement amount L, and a length S in the Y-axis direction from the contact point C to the load concentration position P (in Equation 3, the uppermost load concentration position $P_1$), as shown in FIG. 3 and in Equation 5 (described below). The uppermost load concentration position $P_1$ is the load concentration position P when the center $O_2$ of convex sphere 30a has been moved to an outer side of outer joint member 12 to the fullest extent in the radial direction. The leg shaft movement amount D(θ) is the movement of convex sphere 30a at a given joint angle from its position at a joint angle of 0°. The leg shaft contact point movement amount L is a length in the Y-axis direction from the center $O_2$ of convex sphere 30a to contact point C between leg shaft 30 and inner roller 16.

$$L'=D(\theta)+L+S \quad \text{(Equation 5)}$$

The leg shaft movement amount D(θ) is obtained by a geometric calculation based on a pitch circle radius PCR of leg shaft 30 (that is, a distance from the axis ax1 of inner joint member 14 to the center $O_2$ of convex sphere 30a), and the maximum joint angle θ, according to Equation 6 below.

$$D(\theta)=PCR(1-\cos\theta)/2 \quad \text{(Equation 6)}$$

Figure 4:
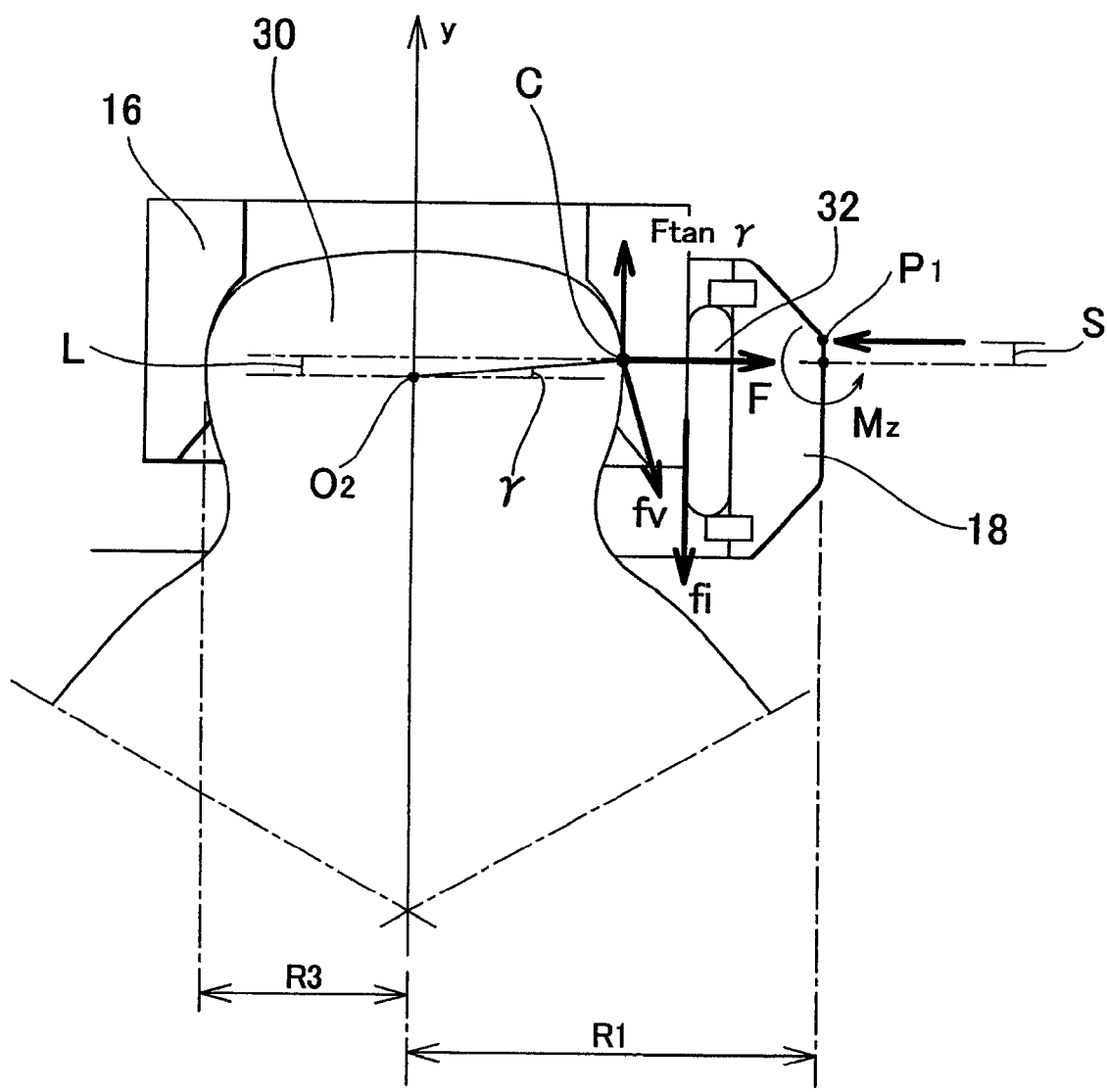
FIG. 4 is an enlarged view of a main portion in FIG. 3.

As apparent from FIG. 4, the leg shaft contact point movement amount L is the product of R3 and the sine of angle γ. This is expressed in Equation 7 below.

$$L=R3\times\sin\gamma \quad \text{(Equation 7)}$$

In Equation 7, R3 is a radius of concave sphere 16a of inner roller 16. Because the value of γ is extremely small, sin γ is substantially equal to tan γ. The value of tan γ is obtained according to Equation 8, which indicates a balance between the forces in the Y-axis direction at contact point C.

$$F\times\tan\gamma=fv\times\cos\gamma+fi \quad \text{(Equation 8)}$$

In Equation 8, F indicates a load applied to inner roller 16 from leg shaft 30 when leg shaft 30 is rotated, fv indicates a frictional force that is generated when contact point C is moved, and fi indicates a frictional force between needle roller 32 and inner roller 16. Additionally, $\mu_2$ indicates the frictional coefficient between inner roller 16 and needle roller 32, and $\mu_3$ indicates the frictional coefficient between convex sphere 30a of leg shaft 30 and concave sphere 16a of inner roller 16. Note that fv and fi are obtained according to Equation 9 and Equation 10, respectively.

$$fv=\mu_3\times F/\cos\gamma \quad \text{(Equation 9)}$$

$$fi=\mu_2\times F \quad \text{(Equation 10)}$$

By substituting Equation 9 and Equation 10 into Equation 8, Equation 11 is obtained.

$$\tan\gamma\approx\sin\gamma=\mu_3+\mu_2 \quad \text{(Equation 11)}$$

Accordingly, the leg shaft contact point movement amount L is obtained by substituting Equation 11 in Equation 7 to arrive at Equation 12.

$$L=R3(\mu_3+\mu_2) \quad \text{(Equation 12)}$$

Also, the length S in the Y-axis direction from contact point C to the uppermost load concentration position $P_1$ is obtained according to Equation 13, obtained by balancing the forces associated with moment Mz acting on inner roller 16 and outer roller 18.

$$Mz=-(R1-R3)\times(F\times\tan\gamma-fv\times\cos\gamma)+F\times S=0 \quad \text{(Equation 13)}$$

Because Equation 14 is obtained based on FIG. 4, Equation 13 can be changed to Equation 15 as shown below.

$$fi=F\times\tan\gamma-fv\times\cos\gamma \quad \text{(Equation 14)}$$

$$-(R1-R3)\times fi+F\times S=0 \quad \text{(Equation 15)}$$

Further, by substituting Equation 10 into Equation 15, Equation 16 is obtained.

$$-(R1-R3)\times\mu_2\times F+F\times S=0 \quad \text{(Equation 16)}$$

By dividing Equation 16 by F, subtracting S, and multiplying by −1, Equation 17 is obtained, which expresses the length from contact point C to the uppermost load concentration position $P_1$.

$$S=\mu_2\times(R1-R3) \quad \text{(Equation 17)}$$

Based on Equations 6, 12, and 17, Equation 5—which indicates the length in the Y-axis direction from the center $O_1$ of outer roller 16 to the uppermost load concentration position $P_1$—may be altered to arrive at Equation 18. Thus:

$$L'=D(\theta)+L+S=PCR(1-\cos\theta)/2+\mu_3 R3+\mu_2 R1 \quad \text{(Equation 18)}$$

Accordingly, when W1 indicates the length in the axial direction of the cylindrical surface from the center of leg shaft 30 and an intersection of cylindrical surface 18a and the upper side taper portion $18b_u$ of outer roller 18, and when W1 is greater than L', the load concentration position P is prevented from moving out of cylindrical surface 18a toward the upper side (that is, the outer peripheral side of outer joint member 12). Thus, P is prevented from moving out of cylindrical surface 18a when Equation 3 is satisfied.

Figure 5:
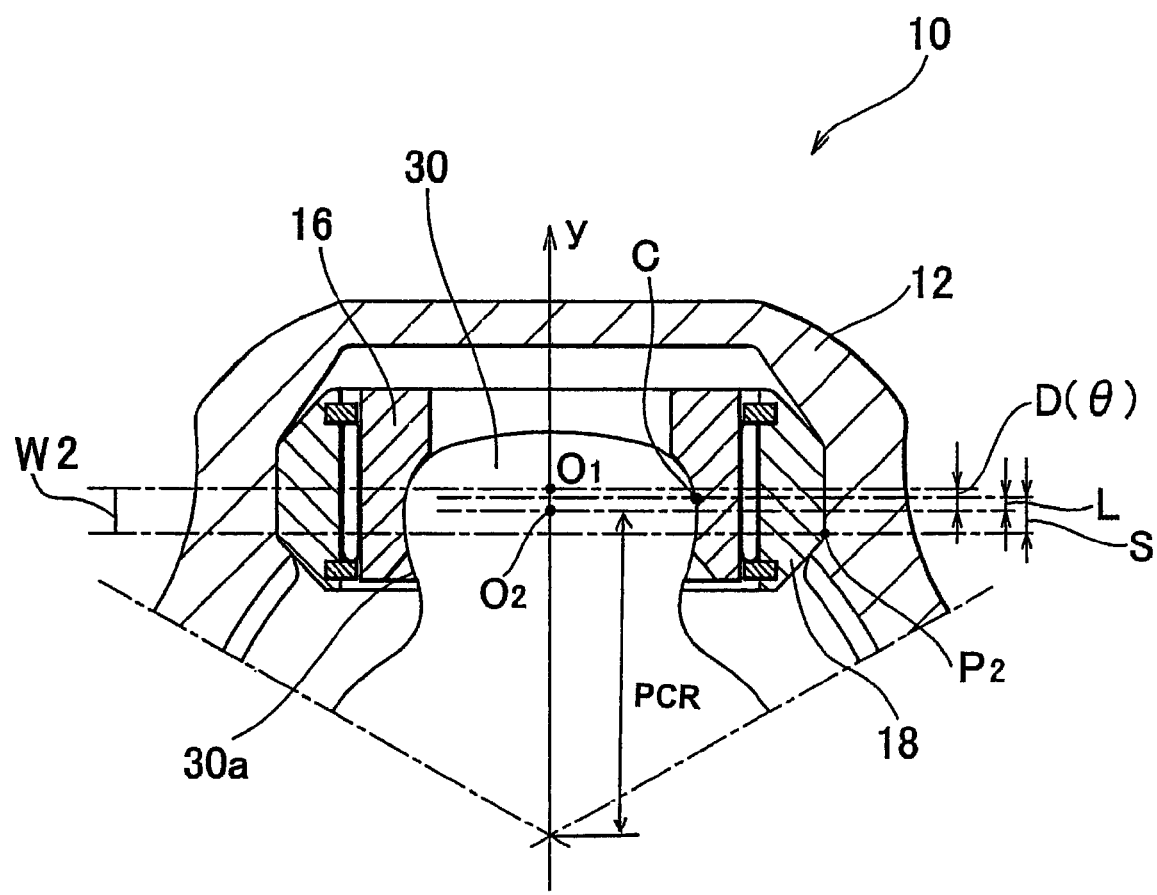
FIG. 5 is a cross sectional view of the constant velocity universal joint, taken along the same plane as in FIG. 1.

Next, Equation 4 will be described with reference to FIGS. 5 and 6. When CV joint 10 is rotated at the maximum joint angle θ, a length L" (not shown) in the Y-axis direction from the center $O_1$ of outer roller 16 to a lowermost load concentration position $P_2$ is a value obtained by adding a length S in the Y-axis direction from contact point C to the load concentration position P (in Equation 4, the lowermost load concentration position $P_2$) to a value obtained by subtracting the leg shaft contact point movement amount L from the leg shaft movement amount $D(\theta)$, as shown in FIG. 5 and Equation 19. The lowermost load concentration position $P_2$ is the load concentration position P when the center $O_2$ of the convex sphere 30a of leg shaft 30 has been moved to the fullest extent to the joint center side of the outer joint member 12 in the radial direction. In other words, the uppermost load concentration position is the intersection of cylindrical surface 18a and upper side taper portion $18b_u$, while the lowermost load concentration position is the intersection of cylindrical surface 18a and the lower side taper portion $18b_l$.

$$L''=D(\theta)-L+S \quad \text{(Equation 19)}$$

The leg shaft movement amount $D(\theta)$ is obtained by a geometric calculation based on the pitch circle radius PCR of leg shaft 30 and the maximum joint angle $\theta$, according to Equation 20 below.

$$D(\theta)=3PCR(1-\cos\theta)/2 \quad \text{(Equation 20)}$$

Figure 6:
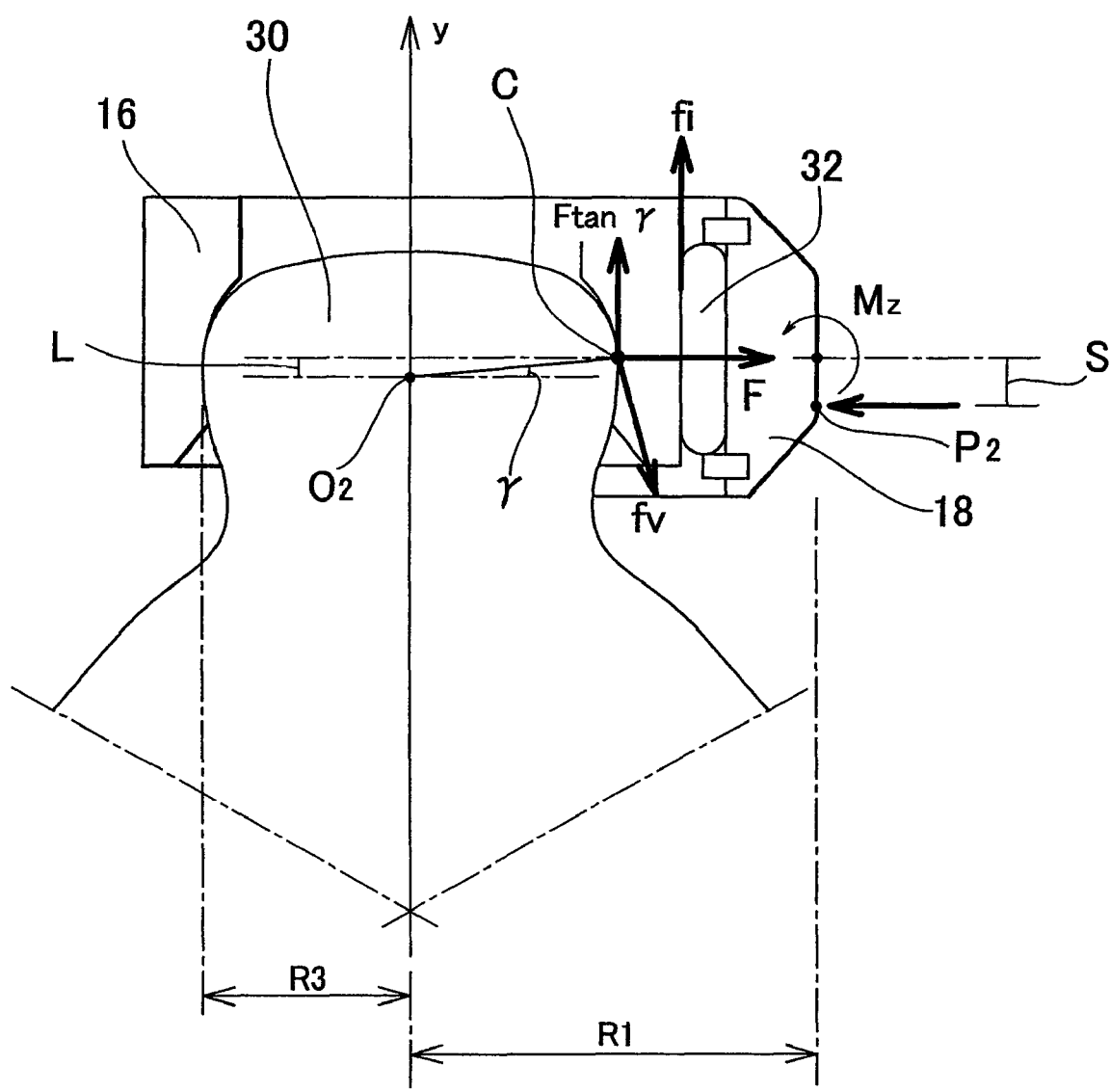
FIG. 6 is an enlarged view of a main portion in FIG. 5.

As apparent from FIG. 6, the leg shaft contact point movement amount L is obtained according to Equation 7 above.

As described above, because the value of $\gamma$ is extremely small, $\sin\gamma$ may be considered to be substantially equal to $\tan\gamma$. The value of $\tan\gamma$ can be obtained according to Equation 21, which indicates a balance between the forces in the Y-axis direction at contact point C.

$$F\times\tan\gamma = fi\times\cos\gamma - fi \quad \text{(Equation 21)}$$

By substituting Equations 9 and 10 into Equation 21, Equation 22 is obtained.

$$\tan\gamma \approx \sin\gamma = \mu_3 - \mu_2 \quad \text{(Equation 22)}$$

Accordingly, leg shaft contact point movement amount L is obtained according to Equation 23.

$$L=R3\times\sin\gamma = R3(\mu_3-\mu_2) \quad \text{(Equation 23)}$$

Length S in the Y-axis direction from contact point C to the lowermost load concentration position $P_2$ is obtained according to Equation 24, which indicates a balance of the moment Mz acting on inner roller 16 and outer roller 18.

$$Mz=-(R1-R3)\times(F\times\tan\gamma - fi\times\cos\gamma)-F\times S=0 \quad \text{(Equation 24)}$$

Using Equation 14, Equation 24 can be altered to arrive at Equation 25 below.

$$-(R1-R3)\times(-fi)-F\times S=0 \quad \text{(Equation 25)}$$

Further, by substituting Equation 10 into Equation 25, Equation 26 is obtained.

$$(R1-R3)\times\mu_2\times F+F\times S=0 \quad \text{(Equation 26)}$$

By dividing Equation 26 by F, subtracting S, and multiplying by -1, Equation 27 is obtained.

$$S=\mu_2(R1-R3) \quad \text{(Equation 27)}$$

Based on Equations 20, 23, and 27, Equation 19—which indicates the length in the Y-axis direction from the center $O_1$ of outer roller 16 to the lowermost load concentration position $P_2$—becomes Equation 28, described below.

$$L''=3PCR(1-\cos\theta)/2-\mu_3 R3+\mu_2 R1 \quad \text{(Equation 28)}$$

Accordingly, when W2 indicates the length in the axial direction of cylindrical surface 18a from the center of leg shaft 30 and an intersection of cylindrical surface 18a and the lower side of taper portion $18b_l$ of outer roller 18, and when W2 is greater than L'', the load concentration position P is prevented from moving out of the cylindrical surface 18a toward the lower side (the joint center side of outer joint member 12). Thus, P is prevented from moving out of cylindrical surface 18a when Equation 4 is satisfied.

As described thus far, according to this embodiment, the right side of Equation 3 indicates the distance in the direction of axis ax2 from the center of cylindrical surface 18a in the axial direction to the load concentration position P in the case where leg shaft 30 has been moved to the outer side of outer joint member 12 to the fullest extent in the radial direction. The right side of Equation 4 indicates the distance in the direction of axis ax2 from the center of the cylindrical surface 18a in the axial direction to the load concentration position P in the case where leg shaft 30 has been moved to the joint center side of outer joint member 12 to the fullest extent in the radial direction. Therefore, when the length of cylindrical surface 18a of outer roller 18 in the axial direction is set so as to satisfy Equations 3 and 4, the load concentration position P of outer roller 18 is prevented from moving out of cylindrical surface 18a so long as the joint angle is equal to or smaller than the maximum joint angle $\theta$. Therefore, moment Mz for tilting outer roller 18, which is generated when the contact point between leg shaft 30 and inner roller 16 is moved, is absorbed between flat surface portion 24a of guide groove 24 of outer joint member 12 and cylindrical surface 18a of outer roller 18. As a result, a contact load which is generated on the rear surface side is reduced, and accordingly, the frictional force is reduced. Thus, the thrust force or vibration can be suppressed during rotation of the CV joint.

According to the embodiment described above, taper portions $18b_u$ and $18b_l$ are formed axially on both sides of cylindrical surface 18a, and taper lateral surfaces 24b and 24c are formed in the lateral surface of guide groove 24, at portions opposed to taper portions $18b_u$ and $18b_l$. Therefore, it is possible to more reliably prevent the end surface of outer roller 18 on the axially outer side from making contact with the inner surface of outer joint member 12. Accordingly, it is possible to further suppress the frictional force generated due to contact therebetween, and the thrust force due to the frictional force.

A method for calculating the maximum joint angle $\theta$ will now be described. Referring to FIG. 2, the maximum joint angle $\theta$ is the largest value of the joint angle where (A) leg shaft 30 does not interfere with (e.g., by colliding with) inner roller 16 and (B) second shaft 28 does not interfere with outer roller 18. Each of these conditions will be addressed in turn.

Figure 13A:
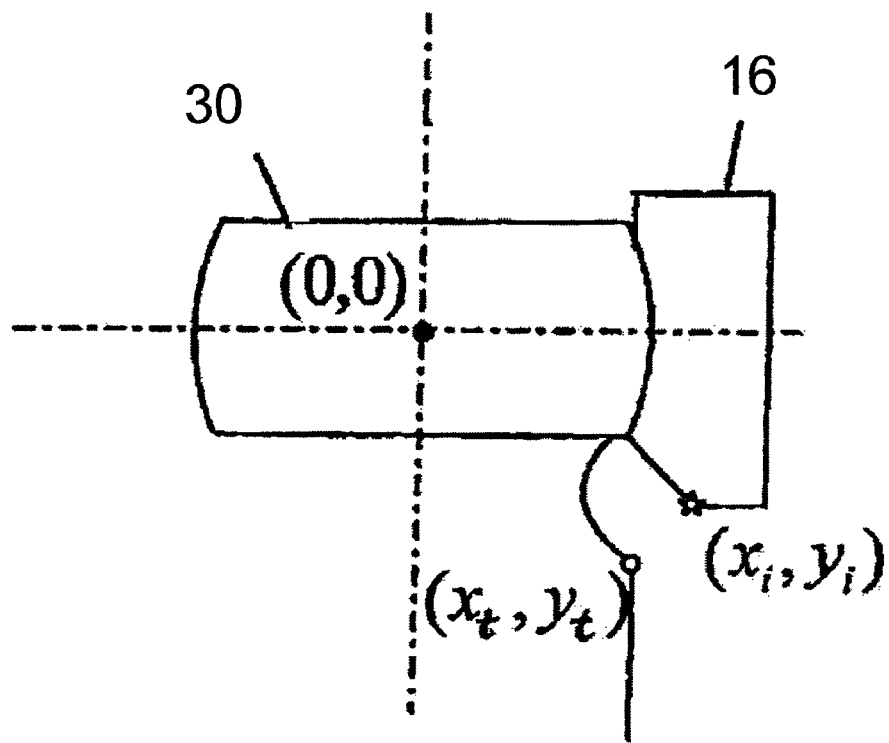
FIG. 13A is a cross sectional view of a portion of the constant velocity universal joint as shown in FIG. 2 at a joint angle of 0°.
Figure 13B:
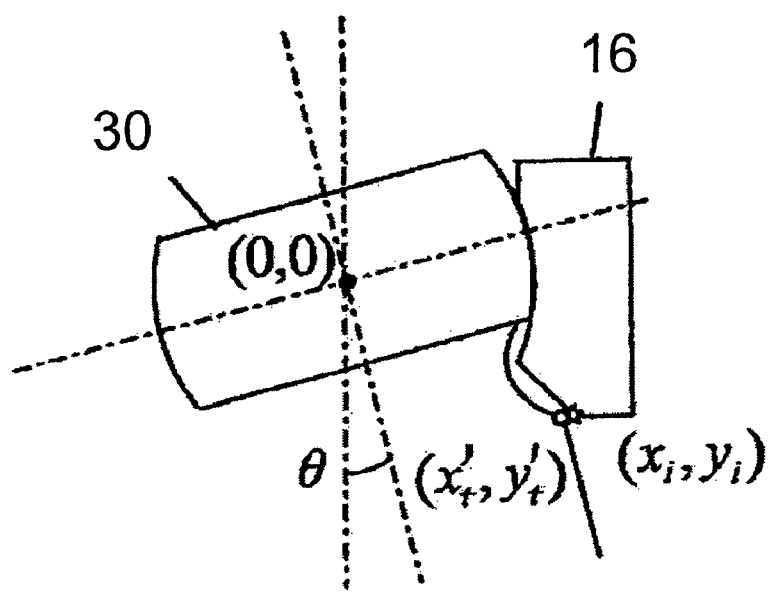
FIG. 13B is a cross sectional view of the constant velocity universal joint in FIG. 13A at a maximum joint angle.

Referring to FIGS. 13A and 13B, condition (A) is satisfied when both inequalities of Equations 29 and 30 hold true.

$$x_i > x'_t \quad \text{(Equation 29)}$$

$$y_i > y'_t \quad \text{(Equation 30)}$$

Where $x'_t$ and $y'_t$ are defined by Equations 31 and 32.

$$x'_t=(x_t\times\cos\theta)-(y_t\times\sin\theta) \quad \text{(Equation 31)}$$

$$y'_t=(y_t\times\cos\theta)+(x_t\times\sin\theta) \quad \text{(Equation 32)}$$

The coordinate values in the above equations are measured from point (0, 0) on leg shaft 30. The quantities $x_i$ and $y_i$ represent the coordinate values of an end portion of inner roller 16, while the quantities $x_t$ and $y_t$ represent coordinate values of the boss portion of leg shaft 30 at a joint angle of 0° (as shown in FIG. 13A). The quantities $x'_t$ and $y'_t$ represent coordinate values of the boss portion of leg shaft 30 at the maximum joint angle $\theta$ (as shown in FIG. 13B). In order to satisfy condition (A), and thus prevent leg shaft 30 from interfering with inner roller 16, the edge of the boss portion of leg shaft 30 ($x_t$, $y_t$) must be to the left and below the edge of inner roller 16 ($x_i$, $y_i$). The joint angle at which the two coordinate points become equal is the maximum joint angle.

Figure 14A:
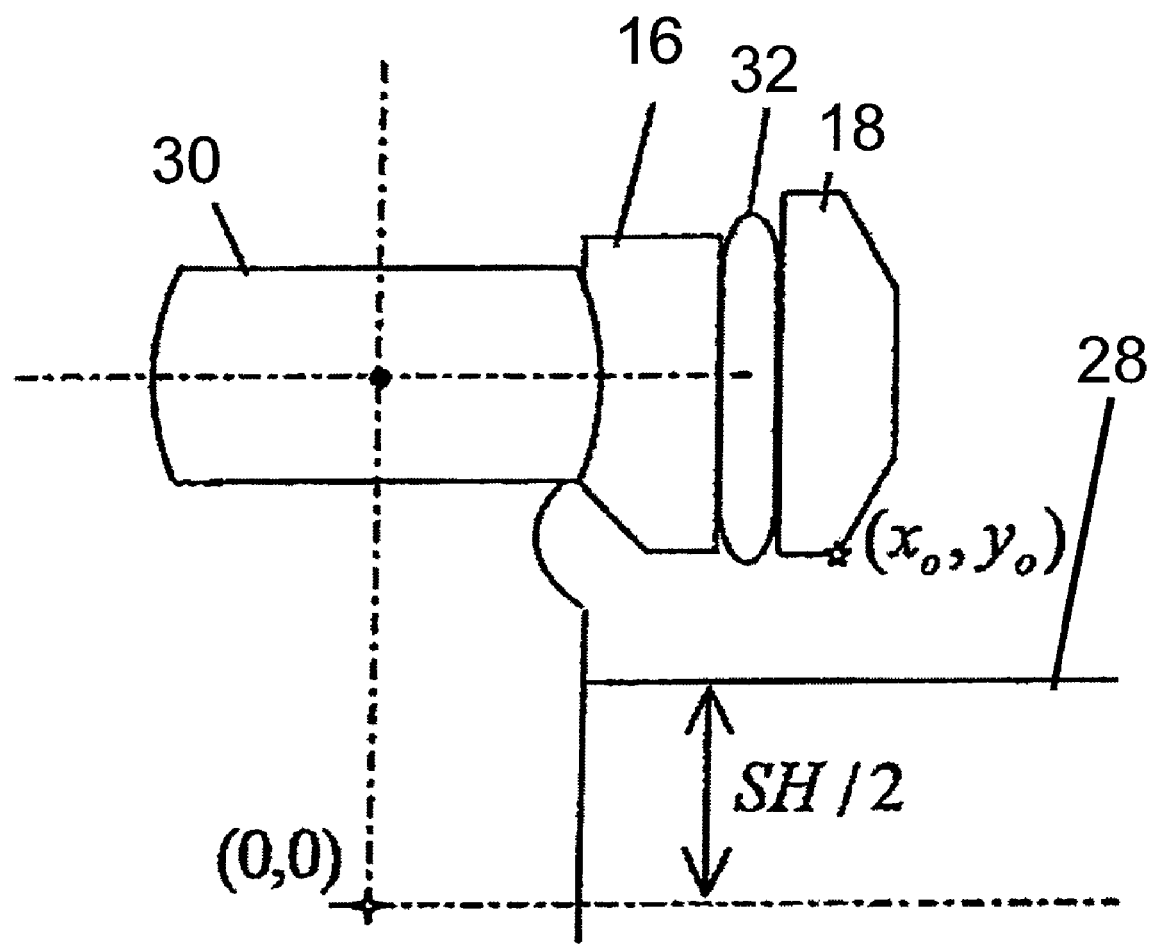
FIG. 14A is a cross sectional view of a portion of the constant velocity universal joint as shown in FIG. 2 at a joint angle of 0°.
Figure 14B:
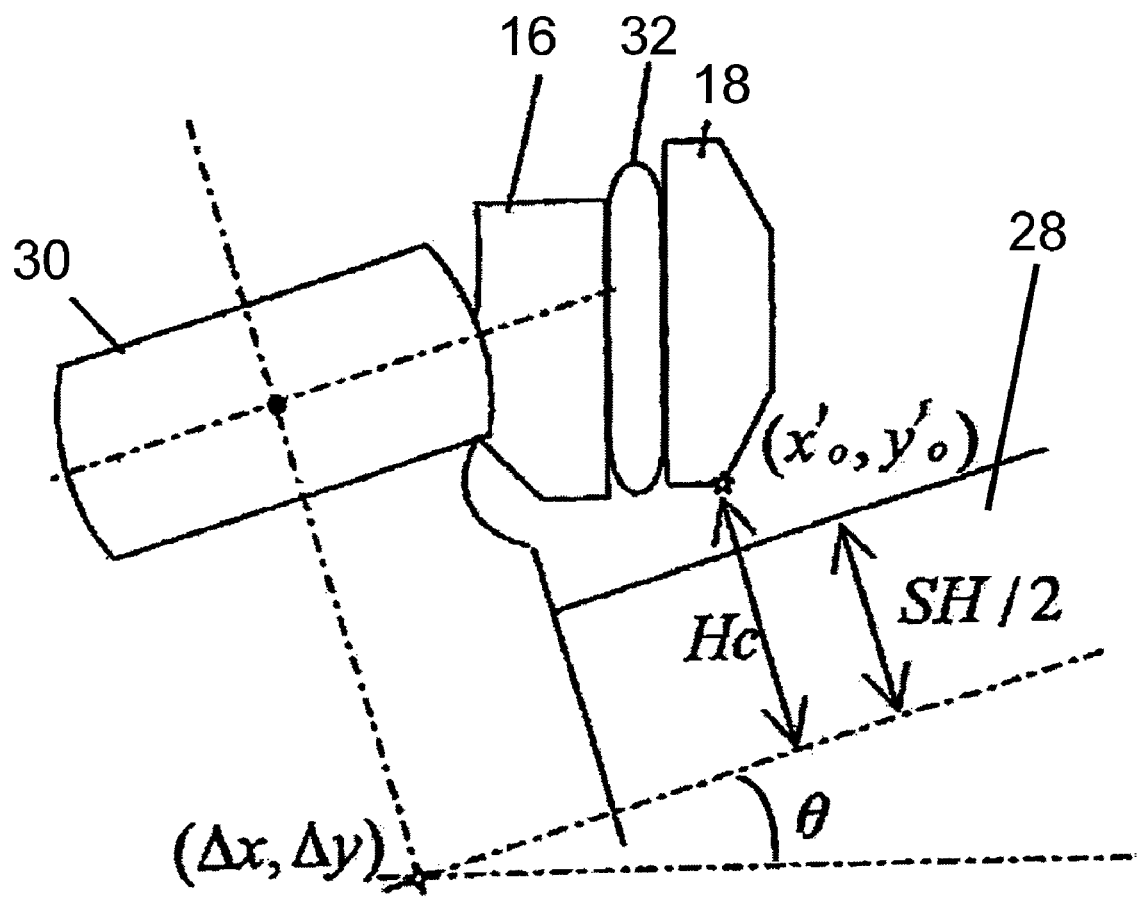
FIG. 14B is a cross sectional view of the constant velocity universal joint in FIG. 14A at a maximum joint angle.

Referring to FIGS. 14A and 14B, a method of determining whether condition (B) is satisfied will now be described. Condition (B) is satisfied when the inequality in Equation 33 holds true.

$$SH/2 < Hc \qquad \text{(Equation 33)}$$

In Equation 33, SH is the diameter of second shaft 28 and Hc is the length between the center axis of second shaft 28 and the end surface of outer roller 18. Hc is given by Equation 34.

$$Hc = -(x'_o \times \sin\theta) + (y'_o \times \cos\theta) \qquad \text{(Equation 34)}$$

In equation 34, θ represents the maximum joint angle. The coordinate values $x'_o$ and $y'_o$, are given by the following equations.

$$x'_o = x_o - \Delta x \qquad \text{(Equation 35)}$$

$$y'_o = y_o - \Delta y \qquad \text{(Equation 36)}$$

$$\Delta x = PCR \times \sin\theta \qquad \text{(Equation 37)}$$

$$\Delta y = -(PCR/2) \times (1 - \cos\theta) \qquad \text{(Equation 38)}$$

In FIGS. 14A and 14B, coordinate values $x'_o$ and $y'_o$ in the above equations are measured from point ($\Delta x$, $\Delta y$), while points $x_o$ and $y_o$ are measured from point (0, 0). In Equations 34-38, ($x_o$, $y_o$) represents a coordinate point along an end-point of outer roller 18 when the joint angle is 0° (as shown by FIG. 14A), while ($x'_o$, $y'_o$) represents a coordinate point along an endpoint of outer roller 18 when the joint angle is the maximum joint angle θ (as shown by FIG. 14B). PCR is the pitch circle radius of the tripod in leg shaft 30. Coordinate point ($\Delta x$, $\Delta y$) represents the change in value of a point on leg shaft 30 from a joint angle of 0° (0, 0) to a position of the same point of leg shaft 30 at the maximum joint angle θ ($\Delta x$, $\Delta y$).

Using Equations 29-38 and various dimensions of a CV joint in accordance with the present invention, the value of the maximum joint angle may be determined. In certain embodiments, the maximum joint angle is about 26°.

Although the embodiment of the invention has been described in detail with reference to the accompanying drawings, the invention can be realized in other embodiments.

Figure 7:
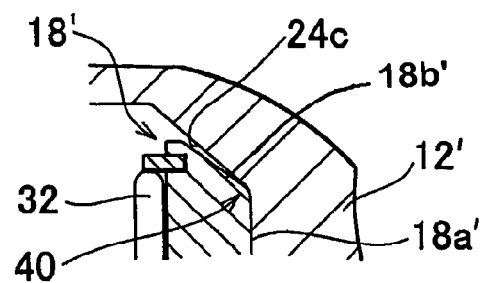
FIG. 7 is an enlarged view showing part of an inner roller and part of an outer joint member in a constant velocity universal joint according to a first modified example of the embodiment, which is different from the constant velocity universal joint in FIG. 1.
Figure 8:
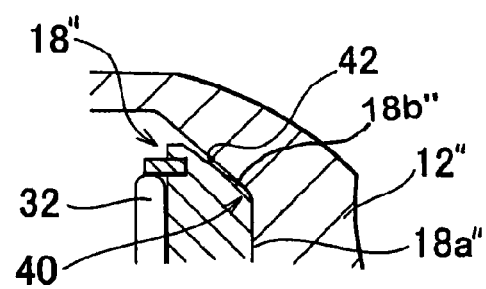
FIG. 8 is an enlarged view showing part of an inner roller and part of an outer joint member in a constant velocity universal joint according to a second modified example of the embodiment, which is different from the constant velocity universal joints in FIG. 1 and FIG. 7.
Figure 9:
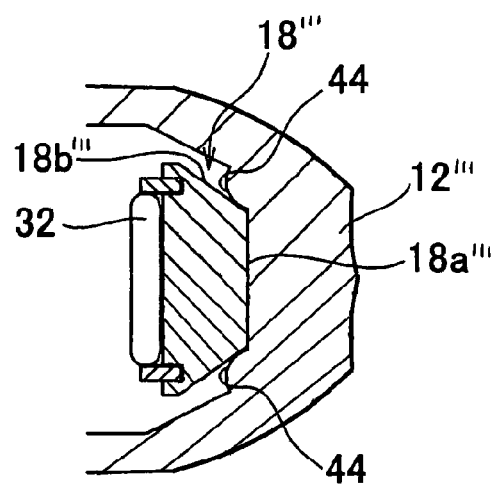
FIG. 9 is an enlarged view showing part of an inner roller and part of an outer joint member in a constant velocity universal joint according to a third modified example of the embodiment, which is different from the constant velocity universal joints in FIG. 1, FIG. 7, and FIG. 8.
Figure 10:
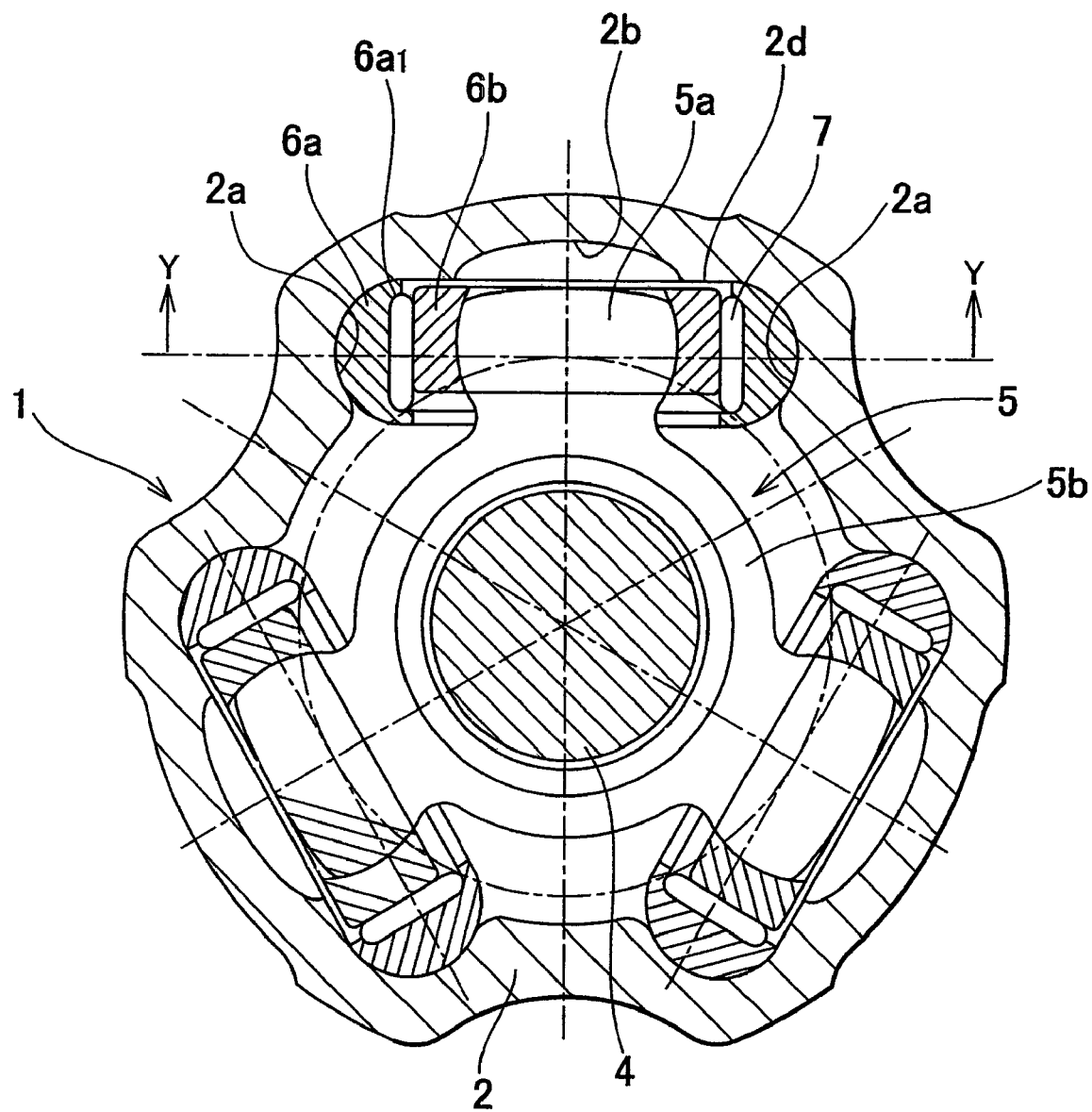
FIG. 10 is a view showing a constant velocity universal joint according to a conventional example, which is disclosed in Japanese Patent Laid-Open Publication No. 2002-147482.
Figure 11:
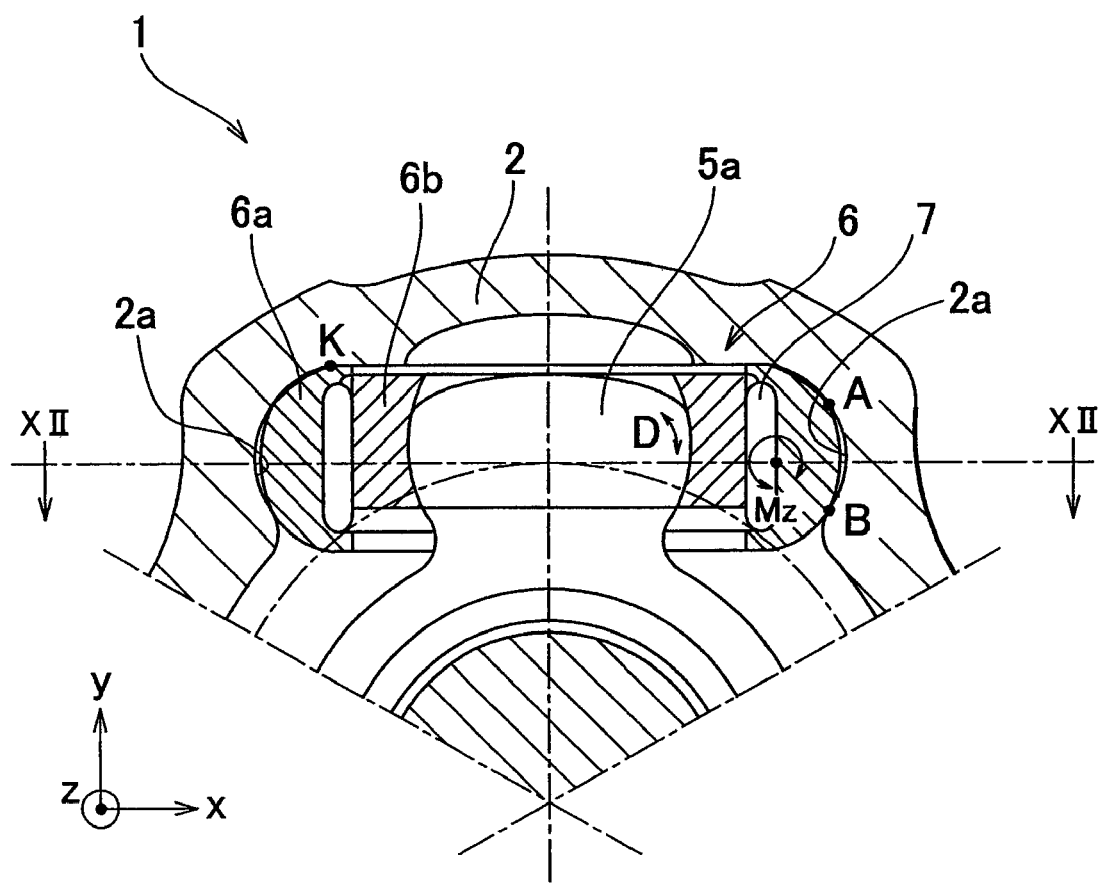
FIG. 11 is a view showing a constant velocity universal joint according to a conventional example, in which an outer roller makes angular contact with a guide groove of an outer joint member.
Figure 12:
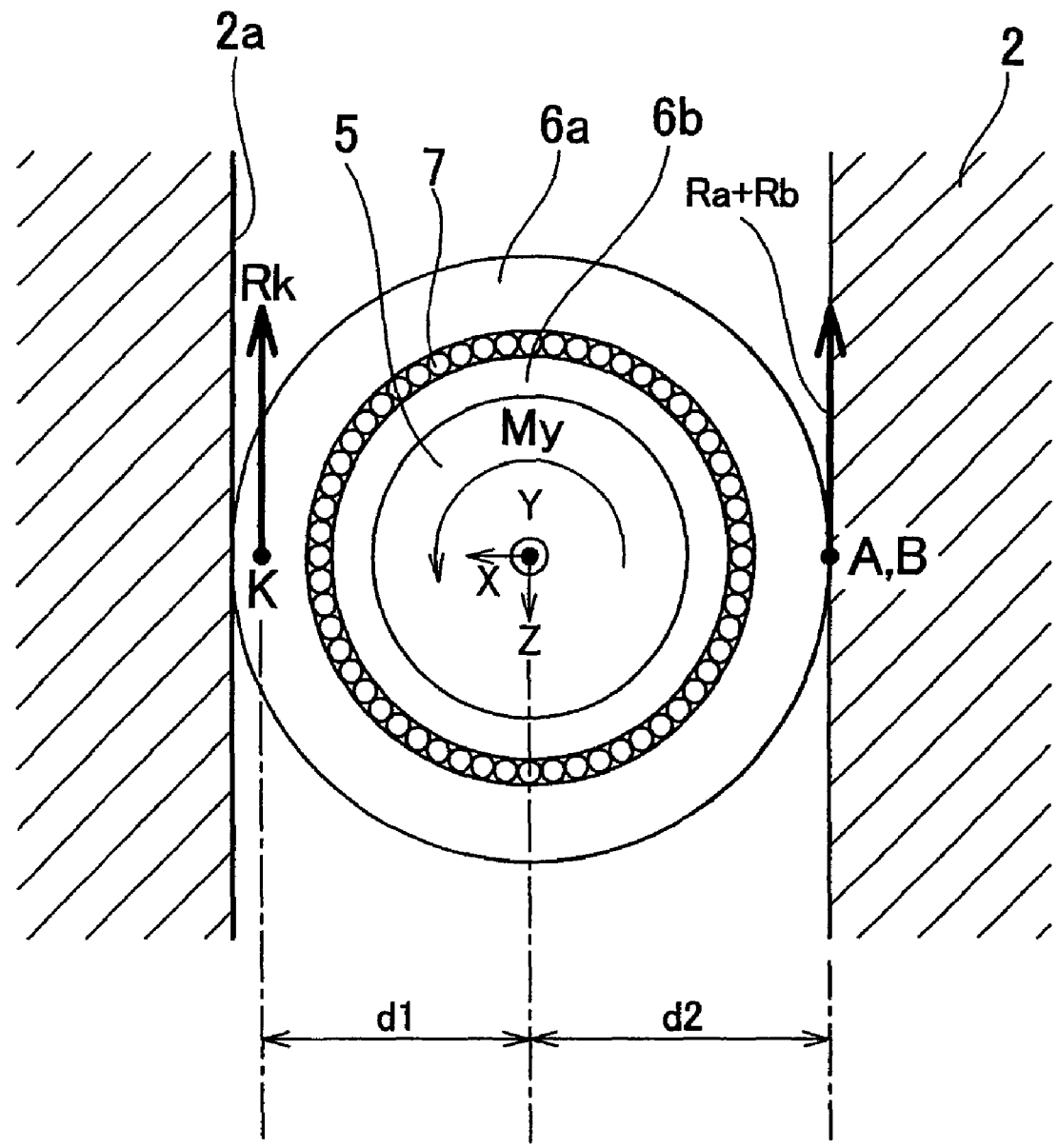
FIG. 12 is a schematic cross sectional view taken along line XII-XII in FIG. 11, which shows the directions of frictional forces Ra and Rb generated at contact points A and B in FIG. 11.

For example, in the aforementioned embodiment, taper portions 18b$_u$ and 18b$_l$ are formed axially on both sides of cylindrical surface 18a, and taper lateral surfaces 24b and 24c are formed in the lateral surface of guide groove 24 at the portions opposed to taper portions 18b$_u$ and 18b$_l$. However, the invention is not limited to this embodiment. As a first modified example, a chamfer 40 that is a curved surface may be formed axially on both sides of cylindrical surface 18a' of outer roller 18', as a substitute of part of taper surface 18b', as shown in FIG. 7. Also, as a second modified example, a chamfer that is a curved surface 40 may be formed axially on both sides of cylindrical surface 18a" of outer roller 18" as a substitute for part of taper portions 18b", and a concave curved surface 42 may be formed on both sides of flat lateral surface 24a of guide groove 24 as a substitute for part of taper surfaces 24b and 24c or as a substitute for the entirety of taper surfaces 24b and 24c, as shown in FIG. 8. As a third modified example, a convex curved surface 44 that protrudes toward the inner side of outer joint member 12 may be formed, as shown in FIG. 9. That is, convex curved surface 44, which protrudes toward an inner side of outer joint member 12''', may be formed in the lateral surface of each guide grooves 24 at a portion opposed to each taper surface 18b''' of outer roller 18'''. In any of the embodiments described in FIGS. 7-9, it is possible to more reliably prevent the end surface of outer roller 18''' on the axially outer side from making contact with the inner surface of outer joint member 12, as in the aforementioned embodiment. Also, it is easy to manufacture a CV joint in which chamfers 40 and 42 are formed axially on both sides of cylindrical surface 18a" of outer roller 18" and on both sides of flat lateral surface 24a of guide groove 24 (as in the embodiment shown in FIG. 8, for example), as compared to a CV joint in the aforementioned embodiment or the embodiments of FIG. 7 or FIG. 9.

Also, in the aforementioned embodiments, three leg shafts 30 are provided. However, other arrangements are possible. For example, four or more leg shafts could be provided. The circumferential spacing between each leg shaft may be equally spaced (e.g., every 90° in the case of four leg shafts) or unequally spaced.

What is claimed is:

1. A constant velocity universal joint, comprising:
    a hollow outer joint member in which plural guide grooves extending in an axial direction of the outer joint member are formed in an inner peripheral surface, and which is connected to a first shaft;
    an inner joint member which is connected to a second shaft, and which is housed in the outer joint member;
    plural leg shafts which is provided in the inner joint member, and each of which protrudes in a radial direction of the second shaft, and in each of which a convex sphere is formed in a tip portion;
    an inner roller in which a concave sphere that is engaged with the convex sphere of each of the leg shafts is formed in an inner peripheral surface;
    an outer roller which is housed in each of the guide grooves of the outer joint member so as to be slidable;
    a rolling body which is provided between the inner roller and the outer roller so that the inner roller and the outer roller are movable with respect to each other in an axial direction of the inner roller and the outer roller, wherein
    each of the leg shafts and the inner roller can be oscillated with respect to each other; a cylindrical surface is formed in a radially outer surface of the outer roller; a flat engagement surface which is engaged with the cylindrical surface of the outer roller is formed in a lateral surface of each of the guide grooves of the outer joint member; and the cylindrical surface of the outer roller satisfies following two equations, $$W1 > PCR(1-\cos\theta)/2 + \mu_3 R3 + \mu_2 R1$$

$$W2 > 3PCR(1-\cos\theta)/2 - \mu_3 R3 + \mu_2 R1, \text{ wherein}$$

W1 indicates a length in an axial direction of the cylindrical surface from a center of the leg shaft and an intersection of the cylindrical surface of the outer roller and an upper side taper portion of the outer roller;

W2 indicates a length in an axial direction of the cylindrical surface from a center of the leg shaft and an intersection of the cylindrical surface of the outer roller and a lower side taper portion of the outer roller;

the lengths in the axial direction of the cylindrical surface of W1 and W2 are respectively equal to or longer than the length between an uppermost load concentration position (P$_1$) and a lowermost load concentration position (P$_2$), wherein the uppermost load concentration position is the intersection of the cylindrical surface of the outer roller and the upper side taper portion of the outer roller, and wherein the lowermost load concentration position is the intersection of the cylindrical surface of the outer roller and the lower side taper portion of the outer roller;

PCR indicates a distance from an axis of the inner joint member to a center of the convex sphere of each of the leg shafts;

θ indicates a required maximum joint angle;

R1 indicates a radius of the cylindrical surface of the outer roller;

R3 indicates a radius of the concave sphere of the inner roller;

$\mu_2$ indicates a friction coefficient when the inner roller is moved with respect to the outer roller in an axial direction of the inner roller; and $\mu_3$ indicates a friction coefficient between the convex sphere of each of the leg shafts and the concave sphere of the inner roller, wherein the coefficients are determined based on the conditions from new through worn, wherein the upper and lower side taper portions are formed in each of axially both sides of the cylindrical surface of the outer roller, and wherein each of the taper portions has a diameter that decreases toward an end portion, wherein a convex curved surface that protrudes toward an inner side of the outer joint member is formed in the lateral surface of each of the guide grooves at a portion opposed to each taper portion of the outer roller.

* * * * *

UNITED STATES PATENT AND TRADEMARK OFFICE
CERTIFICATE OF CORRECTION

PATENT NO. : 8,029,372 B2
APPLICATION NO. : 12/277993
DATED : October 4, 2011
INVENTOR(S) : Atsushi Ando et al.

Page 1 of 1

It is certified that error appears in the above-identified patent and that said Letters Patent is hereby corrected as shown below:

| Column | Line | |
|---|---|---|
| 2 | 50 | After the equation, insert -- (Equation 2) --. |
| 8 | 43 | Change (Equation 16) to read as follows: |
| | | -- $-(RI-R3) \times \mu_2 \times F + F \times S = 0$    (Equation 16) --. |
| 11 | 46 | Change "portions $18b$, and $18b$," to |
| | | -- portions $18b_u$ and $18b_l$, --. |

Signed and Sealed this
Seventeenth Day of April, 2012

David J. Kappos
*Director of the United States Patent and Trademark Office*